United States Patent [19]

Lonberger

[11] 4,147,526

[45] Apr. 3, 1979

[54] GLASS FIBER PRODUCING AND COLLECTING APPARATUS

[75] Inventor: John W. Lonberger, Newark, Ohio

[73] Assignee: Owens-Corning Fiberglas Corporation, Toledo, Ohio

[21] Appl. No.: 866,130

[22] Filed: Dec. 30, 1977

[51] Int. Cl.² ............................................. C03B 37/00
[52] U.S. Cl. ........................................ 65/11 W; 65/2; 242/18 G
[58] Field of Search ................. 65/2, 11 W; 242/18 G

[56] References Cited

U.S. PATENT DOCUMENTS

| | | | |
|---|---|---|---|
| 3,452,214 | 6/1969 | Martin | 307/96 |
| 3,471,278 | 10/1969 | Greim | 65/11 W X |
| 3,847,579 | 11/1974 | Fulk et al. | 65/11 W |

Primary Examiner—Robert L. Lindsay, Jr.
Attorney, Agent, or Firm—Ronald C. Hudgens; Charles F. Schroeder; Oliver E. Todd, Jr.

[57] ABSTRACT

An improved microcomputer controlled winder for attenuating a plurality of streams of molten glass issuing from a bushing into fibers and for collecting a strand of such attenuated fibers into a package. A constant speed motor drives a winder collet through an electromagnetically actuated clutch. The microcomputer controls the phase angle firing of an SCR circuit which drives the clutch to in turn control the winder collet speed.

5 Claims, 2 Drawing Figures

GLASS FIBER PRODUCING AND COLLECTING APPARATUS

BACKGROUND OF THE INVENTION

This invention relates to glass fiber production and, more particularly, to an improved microcomputer controlled winder for attenuating a plurality of streams of molten glass into fibers and for collecting the fibers as a strand on a wound package.

One method for manufacturing textiles from glass involves attenuating a plurality of streams of molten glass into fibers, collecting the fibers into a strand and winding the strand into a package for subsequent use in manufacturing various products. The molten glass initially flows at a controlled rate from a furnace forehearth into a feeder or bushing which has a plurality of orifices formed in its bottom. As the molten glass flows from the orifices, it is pulled downwardly at a high rate of speed for attenuation into fibers. A plurality of attenuated fibers are then gathered together into a strand, coated with a sizing, and the strand is wound onto a package on a winder collet. The speed of the winder is controlled in an attempt to maintain a uniform attenuation speed, which in turn produces a uniform diameter in the attenuated fibers if other conditions such as the temperature of the molten glass remain constant. Since the strand is wound onto a core to form a package, the diameter of the package will gradually increase. As the diameter increases, the rotational speed of the collet must be simultaneously decreased to maintain a constant attenuation rate.

Various controls have been known in the prior art for controlling a winder collet speed for maintaining a substantially uniform attenuation rate as the size of a package on which glass fibers are wound changes. In a typical prior art system, a digital computer or other process controller stores data corresponding to a desired winder collet speed at different predetermined points of time after the start of winding a package. At each of these points of time, the winder collet speed is sampled and compared with the desired speed for generating an error signal. The error signal is used to modify the winder collet speed in order to reduce the deviation between the desired speed and the actual speed. In one prior art system, as illustrated in U.S. Pat. No. 3,471,278 which issued Oct. 7, 1969, the winder speed is controlled by means of a magnetic clutch connecting a constant speed motor to a generator. The output from the generator in turn drives the winder motor. A digital computer generates an output signal which is converted to an analog signal for driving a ramp function generator. The ramp function generator in turn drives the magnetic clutch to warp or ramp down the speed of the winder collet as the diameter of the package increases to maintain a constant fiber attenuation and strand collection speed. In order to change the product collected on the winder, a different analog winder speed ramp curve must be stored in the digital computer. Since the system requires analog signals for controlling the winder, some degree of error may enter into the winder speed, which in turn results in a variation of the diameter of the attenuated fibers.

SUMMARY OF THE INVENTION

According to the present invention, a winder speed is digitally controlled to maintain a predetermined attenuation and collection rate for a strand of glass fibers. A constant speed motor is connected through an electromagnetically actuated clutch for driving a winder collet. An integrated circuit microcomputer or microprocessor which receives feedback data on the actual winder collet speed, generates a digital output which is used for phase firing two SCRs. This in turn controls power to the magnetic clutch for controlling coupling between the constant speed motor and the winder collet.

The winder collet speed is controlled in accordance with a third order polynomial which provides a predetermined speed curve. The actual curve for each product is determined by the constants in the polynomial. The polynomial is programmed into a microcomputer or other digital controller for the winder. Preferably, the constants for the polynomial are stored in a separate memory which stores the constants for defining the speed curve for a number of different products. Merely by telling the microcomputer which product is to be manufactured, the appropriate constants will be read from the memory and used in solving the polynomial for any point in the speed curve from an initial starting time. This differs from prior art systems in which digitized analog data for a single speed curve is stored and used for generating an error signal which controls the winder speed.

Accordingly, it is an object of the present invention to provide an improved speed controller for a winder which collects textile fibers.

Another object of the invention is to provide an improved speed controller for a winder which attenuates a plurality of streams of molten glass into fibers and collects the attenuated fibers into a wound package.

Other objects and advantages of the invention will become apparent from the following detailed description, with reference being made to the accompanying drawings.

DESCRIPTION OF THE PREFERRED EMBODIMENTS

Figures 1, 2:
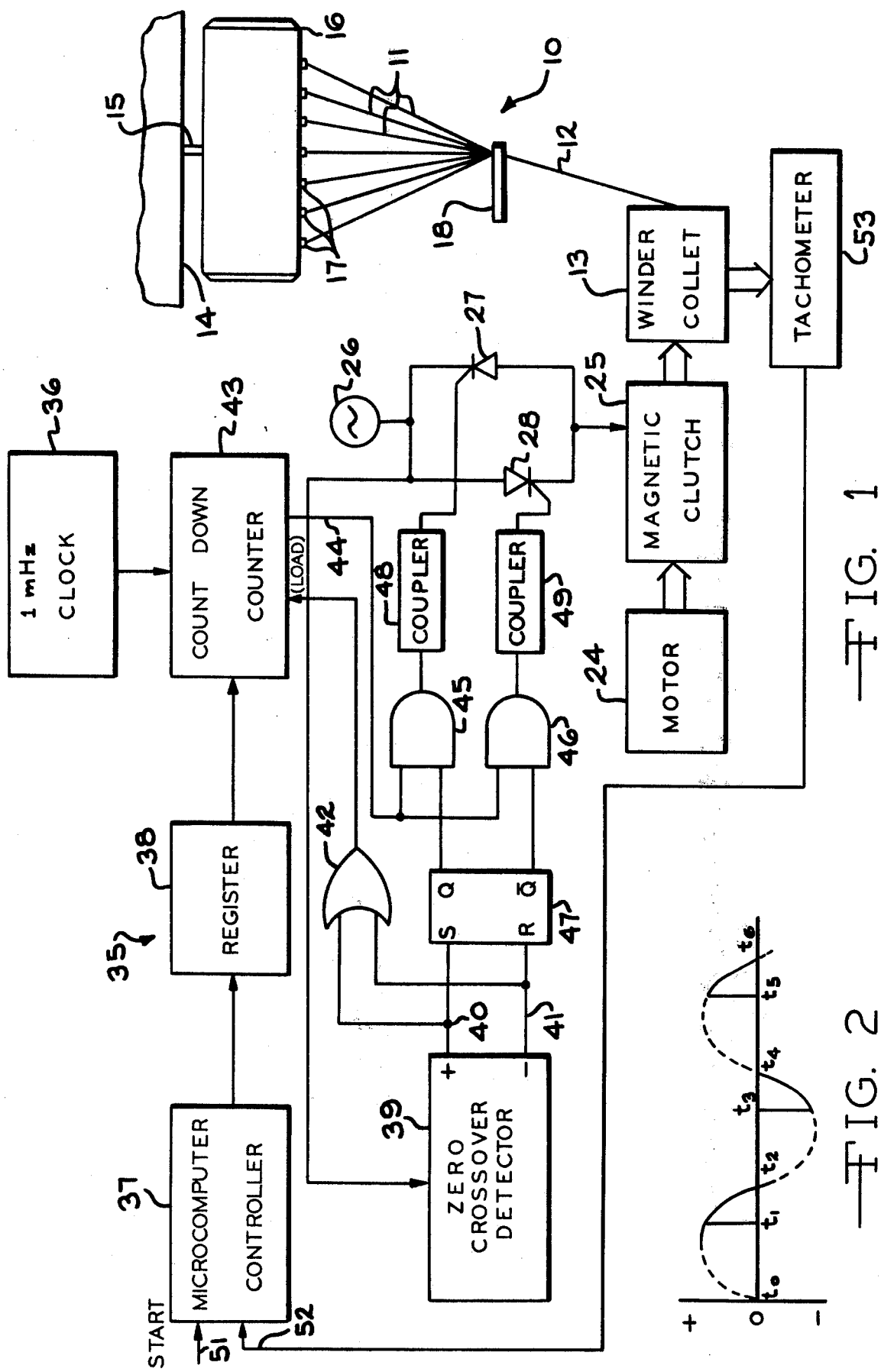
FIG. 1 is a schematic block diagram of glass fiber producing apparatus in which a plurality of glass fibers are attenuated and wound onto a package and of apparatus for controlling the speed of the winder.
FIG. 2 is a graph showing the signal for triggering SCRs which control the speed of the winder collet.

Turning now to the drawings and particularly to FIG. 1, a schematic block diagram is shown of apparatus 10 for producing a plurality of fibers or filaments 11 from glass or other thermoplastic material and for gathering the filaments 11 into a strand 12 which is wound into a package on a winder collet 13. Initially, a molten homogeneous glass is prepared in a furnace (not shown). The molten glass flows into a furnace forehearth 14 and from there a controlled stream 15 of the molten glass flows into a bushing or feeder 16. From the bushing 16, the molten glass flows into a plurality of streams through a grid of orifices 17 formed in the bottom of the bushing 16. Normally, the bushing 16 is electrically heated to control the temperature and therefore the viscosity of the issuing streams of molten glass. The streams of molten glass issuing from the orifices 17 are pulled at a high rate of speed for attenuation into the individual fibers 11. The attenuated fibers 11 pass downwardly in a generally conical pattern to a gathering member 18 which forms the strand 12. The gathering member 18 may also apply a suitable sizing fluid to the strand, in a known manner. From the gathering member 18, the strand 12 moves to the winder collet 13 where it is wound on a core to form a package. The winder collet 13 is of conventional design and includes a level wind apparatus for distributing the strand 12 in layers on the rotating core.

On collection of the strand into a wound package, a gradual buildup of the package radius occurs in the packaging cycle. For a given speed of the collection tube or core, the linear speed of attenuation is in effect gradually increased to a maximum linear speed towards the end of the packaging cycle. In other words, at the start of a packaging cycle, the linear speed of attenuation of the fiber from the feeder is determined both by the rotational speed of the package and by the circumference of the package which is based upon a relatively small radius. As buildup of the package occurs, the speed of attenuation is dependent upon the increasing circumference of the package. If the speed of attenuation is allowed to increase, the diameter of the attenuated fibers will decrease, provided the temperature of the molten glass and other factors remain constant. This is due to the fact that the flow rate of the molten glass through the orifices 17 is determined in part by the viscosity of the glass which, in turn, is temperature dependent. Therefore, it is desirable to decrease the speed of the winder collet 13 as the package builds up to maintain a constant linear speed for attenuating the fibers 11. A constant attenuation speed produces a uniform fiber diameter throughout the package, provided other factors such as glass temperature remain constant.

The apparatus 10 is designed to modify the speed of the winder collet 13 during package buildup to maintain a predetermined speed profile for the winder collet 13 for each successive package cycle. Normally, the winder collet speed will gradually decrease through the package cycle to maintain a constant attenuation rate. However, other variations may be provided in the winder collet speed, when desired.

The winder collet 13 is driven from a constant speed motor 24. The constant speed motor 24 is coupled through a magnetic clutch 25 which is electrically actuated. By controlling power to the clutch 25, the speed of the winder collet 13 is in turn controlled. Power is applied from an AC power source 26 through a pair of back-to-back connected silicon controlled rectifiers (SCRs) 27 and 28 to actuate the magnetic clutch 25. As best seen in FIG. 2, the SCRs 27 and 28 are alternately fired at a predetermined phase angle or point in each half cycle of the AC power from the source 26. The SCR 27 controls positive half cycles and the SCR 28 controls negative half cycles. If the positive half cycle from the power source 26 begins at a time $t_0$, the SCR 27 is fired or triggered at a predetermined time $t_1$ after the beginning of the cycle. At this point, the SCR 27 becomes conductive and passes the remainder of the half cycle to the magnetic clutch 25. At time $t_2$, the positive half cycle is terminated and, as the negative half cycle begins, the SCR 27 ceases to conduct. At a predetermined time $t_3$ in the negative half cycle, the SCR 28 is fired to pass the remainder of the negative half cycle from the power source 26 to the clutch 25. The SCR 28 continues to conduct until a time $t_4$ wherein the negative half cycle has terminated and power from the source 26 becomes positive. This cyclic arrangement is continuously repeated to control coupling from the motor 24 through the clutch 25 to the winder collet 13. By advancing the times $t_1$ and $t_3$ when the SCRs 27 and 28, respectively, are fired, power applied to the clutch 25 increases to increase the winder collet speed. Similarly, delaying the times $t_1$ and $t_3$ decreases power to the clutch 25 to decrease the winder collet speed.

Turning back again to FIG. 1, a digital control circuit 35 is provided for phase firing the SCRs 27 and 28 at a preselected point in each positive and negative half cycle, respectively. The digital control circuit 35 provides precise timing for precisely regulating the speed of the winder collet 13. The accuracy of the timing is determined by a clock 36 and data from a microcomputer controller 37. As will be discussed in greater detail below, the microcomputer controller 37 stores a digital number in a register 38 which corresponds to the time interval or number of clock pulses from the clock 36 from the beginning of a half cycle to the triggering of one of the SCRs 27 or 28. In other words, the numbers stored in the register 38 correspond to the number of clock pulses from the clock 36 between the time $t_0$ and the time $t_1$ for firing the SCR 27 and the number of clock pulses between the time $t_2$ and the time $t_3$ for firing the SCR 28.

The output from the AC power source 26 is applied to a zero crossover detector 39 in addition to the magnetic clutch 25. The zero crossover detector 39 is of conventional design and generates an output 40 at the time $t_0$ when the AC power from the source 26 goes from negative to positive and generates an output 41 at the time $t_2$ when the AC power from the source 26 goes from positive to negative. The outputs 40 and 41 from the zero crossover detector 39 are applied through an OR gate 42 to a load input on a countdown counter 43. This causes the number stored in the register 38 to be shifted into the counter 43. The counter 43 is then immediately counted down towards zero by pulses from the clock 36. As soon as the counter 43 is counted to zero, an output 44 is generated and applied in parallel to two AND gates 45 and 46. An S-R flip-flop 47 enables one of the two AND gates 45 and 46, depending upon whether the output from the AC power source 26 is positive or negative. The positive output 40 from zero crossover detector 39 sets the flip-flop 47 to enable the AND gate 45 and the negative output 41 from the zero crossover detector 39 resets the flip-flop 47 to enable the AND gate 46. When the AND gate 45 is enabled by the flip-flop 47, the output 44 from the countdown counter 43 passes through the AND gate 45 and through an optical coupler 48 to trigger the SCR 27 for passing the remainder of a positive half cycle. Similarly, when the flip-flop 47 enables the AND gate 46, the output 44 from the countdown counter 43 passes through the gate 46 and through an optical coupler 49 to trigger the SCR 28 for passing the remainder of a negative half cycle from the power source 26. The couplers 48 and 49 may be of any conventional design for providing isolation between the low voltage and gates 45 and 46 and the SCRs 27 and 28. For example, the optical couplers may be commercial units which include a light emitting diode (LED) which is optically coupled to a photo transistor. When the LED is excited, it emits light which changes the impedance of the photo transistor. This impedance change in turn provides an output for triggering the connected SCR.

The microcomputer controller 37 is a commercially available unit and generally comprises an integrated circuit central processing unit, a plurality of integrated circuit read only memories (ROM) which store a fixed program and fixed data and one or more integrated circuit random access memories (RAM) which temporarily store input and output data as well as data being operated on by the central processing unit. The microcomputer controller 37 is provided with various inputs such as timer inputs, a feedback speed input from the winder collet 13, one or more sensor inputs from the bushing 16, and other operator and machinery inputs which indicate the current operating conditions for the apparatus 10. The microcomputer controller 37 also includes an input 51 which may be manually or automatically generated for indicating a start of a package on the winder collet 13 and as an input 52 from a tachometer 53 which indicates the current operating speed of the winder collet 13. The microcomputer controller 37 is programmed to periodically compare the actual winder collet speed with a set point speed which is determined from a formula programmed in the microcomputer controller 37. The result of this comparison generates a digital number which is stored within the register 38 for controlling the phase angle firing of the SCRs 27 and 28 which in turn controls the winder collet speed.

In the past, digital computers connected for controlling the speed of winder collets have been provided with digitized analog data defining points on a desired speed curve. However, it has been found that the microcomputer controller 37 can be programmed to solve the polynomial $A_0 + A_1 t + A_2 t^2 + A_3 t^3 = S$ where $A_0$, $A_1$, $A_2$ and $A_3$ are constants which define the speed curve for the winder collet 13 and S is the desired speed at a given time t from the beginning of a package. It will be noted from this polynomial that the initial starting speed is equal to the constant $A_0$ and that the speed curve is then determined by the constants $A_1$, $A_2$ and $A_3$. If $A_2$ and $A_3$ are set equal to zero, the speed will increase or decrease linearly from the initial strating speed $A_0$. Ideally, the winder collet 13 will be designed for collecting several different products, or strands 12 formed from fibers having different diameters for different products. Therefore, the microcomputer controller 37 may be provided with several sets of constants $A_0$, $A_1$, $A_2$ and $A_3$ permanently stored in a ROM for defining the speed curves for several different products. An operator for the apparatus 10 then selects which product is to be manufactured which in turn automatically selects the constants $A_0$, $A_1$, $A_2$ and $A_3$ used in solving the polynomial for a desired speed curve. As a consequence, the apparatus 10 is capable of manufacturing a number of different products which can be easily and quickly selected by an operator.

In the above description, a magnetic clutch 25 has been used for coupling a constant speed motor 24 and the winder collet 13 for controlling the winder collet speed. However, it should be appreciated that the control circuit 35 may equally well directly control the speed of a motor which is permanently connected to the winder collet 13 rather than controlling the magnetic clutch. Also, the countdown counter 43 can be replaced with a counter and a comparator. The clock increments the counter from a zero crossover until the contents of the counter equal the contents of the register 38, at which time an output 44 is generated by the comparator for triggering one of the SCRs 27 or 28. Various other changes and modifications may also be made to the apparatus 10 without departing from the spirit and scope of the following claims.

What I claim is:

1. Apparatus for producing continuous fibers from a supply of thermoplastic material comprising a feeder adapted to contain a molten supply of the material and having a plurality of orifices formed therein for issuing a like plurality of streams of the molten material, and means for attenuating the streams into fibers and for collecting said fibers into a wound package including collet means for supporting the package, electric motor means for rotating said collet and the supported package, and means for controlling the speed said motor means drives said collet comprising means for generating a digital signal indicative of a desired collet speed, an AC power source, at least one controlled gate means for applying power from said source to said controlling means, and digital means responsive to said digital signal for triggering said gate means at a predetermined point in each half cycle of said AC power for controlling the speed of said collet.

2. Apparatus for producing continuous fibers, as set forth in claim 1, wherein the digital signal indicative of a desired collet speed comprises a digital time signal from the beginning of each half cycle to the predetermined point in such half cycle, and wherein said digital means includes digital timing means for measuring the time from the start of a half cycle, said digital timing means including means for generating an output when the measured time corresponds to the digital time signal, and means responsive to said output for triggering said gate means.

3. Apparatus for producing continuous fibers from a supply of thermoplastic material comprising a feeder adapted to contain a molten supply of the material and having a plurality of orifices formed therein for issuing a like plurality of streams of the molten material, and means for attenuating the streams into fibers and for collecting said fibers into a wound package including collet means for supporting the package, electric motor means for rotating said collet means and the supported package, and means for controlling the speed said motor means drives said collet means comprising means for generating a digital signal indicative of a desired collet speed, an AC power source, at least one controlled gate means for applying power from said source to said controlling means, said gate means comprising two SCRs connected back-to-back between said AC power source and said controlling means, one of said SCRs controlling positive half cycles from said AC power source and the other SCR controlling negative half cycles from said AC power source, digital means responsive to said digital signal for triggering said gate means at a predetermined point in each half cycle of said AC power for controlling the speed of said collet, said digital signal indicative of a desired collet speed comprising a digital time signal from the beginning of each half cycle to a predetermined point in such half cycle, said digital means including digital timing means for measuring the time from the start of a half cycle, said digital timing means including means for generating an output when the measured time corresponds to the digital time signal, and means responsive to said output for triggering said gate means, said means responsive to said output triggering said one SCR at the predetermined point in each positive half cycle and triggering said other SCR at the predetermined point in each negative half cycle.

4. Apparatus for producing continuous fibers from a supply of thermoplastic material comprising a feeder adapted to contain a molten supply of the material having a plurality of orifices formed therein for issuing a like plurality of streams of the molten material, and means for attenuating the streams into fibers and for collecting said fibers into a wound package including collet means for supporting the package, electric motor means for rotating said collet means and the supported package, and means for controlling the speed said motor means drives said collet means comprising means for generating a digital signal indicative of a desired collet speed, an AC power source, at least one controlled gate means for applying power from said source to said controlling means, digital means responsive to said digital signal for triggering said gate means at a predetermined point in each half cycle of said AC power for controlling the speed of said collet means, the digital signal indicative of a desired collet speed comprising a digital time signal from the beginning of each half cycle to the predetermined point in such half cycle, said digital means including digital timing means for measuring the time from the start of a half cycle, said digital timing means including means for generating an output when the measured time corresponds to the digital time signal, a countdown counter, means responsive to the beginning of each half cycle for shifting said digital timing signals into said counter and clock means for periodically decrementing said counter towards zero, said counter including means generating said output when decremented to zero, and means responsive to said output for triggering said gate means.

5. Apparatus for producing continuous fibers, as set forth in claim 4, wherein said means responsive to the beginning of each half cycle comprises zero crossover detector means for generating a shift signal each time power from said AC source changes polarity, such shift signal storing said digital timing signal in said countdown counter.

* * * * *